United States Patent [19]
Winterberg

[11] 4,435,354
[45] Mar. 6, 1984

[54] METHOD FOR THE RELEASE OF THERMONUCLEAR ENERGY COMBINING IMPACT, MAGNETIC AND INERTIAL CONFINEMENT FUSION

[76] Inventor: F. Winterberg, 5395 Goldenrod Dr., Reno, Nev. 89511

[21] Appl. No.: 196,928

[22] Filed: Oct. 14, 1980

[51] Int. Cl.$^3$ .............................................. G21B 1/00
[52] U.S. Cl. ................................................ 376/108
[58] Field of Search ...................... 376/108, 102, 125; 89/8

[56] References Cited

PUBLICATIONS

Fusion, Dec. 1980, pp. 24–25, Winterber.
Nature, vol. 258, No. 5535, pp. 512–514 (12/11/75), Winterber.

*Primary Examiner*—Sal Cangialosi

[57] ABSTRACT

In the invention, first a relatively large mass is accelerated to a few 10 km/sec and then used to implode and compress a dense magnetized plasma confined inside a small cavity. In the proposed invention the dense plasma shall consist of thermonuclear material, as for example DT, and shall reach upon compression the temperature for thermonuclear ignition. The magnetized plasma is thereby permitted to be preheated by a laser or particle beam or a gas discharge to reduce the required compression to reach thermonuclear ignition. After having reached the ignition temperature the plasma undergoes a thermonuclear burn excursion, greatly increasing its energy content. During this excursion a small window in the wall of the chamber confining the burning plasma breaks open releasing a large amount of the energy within the cavity in the form of black body radiation and shock waves. The energy flux from both the black body radiation and the shock wave is then used to ablatively implode a second stage high density high yield thermonuclear target. The importance of this two stage arrangement is that it permits much higher yields than would be possible with a one stage magnetized target.

5 Claims, 4 Drawing Figures

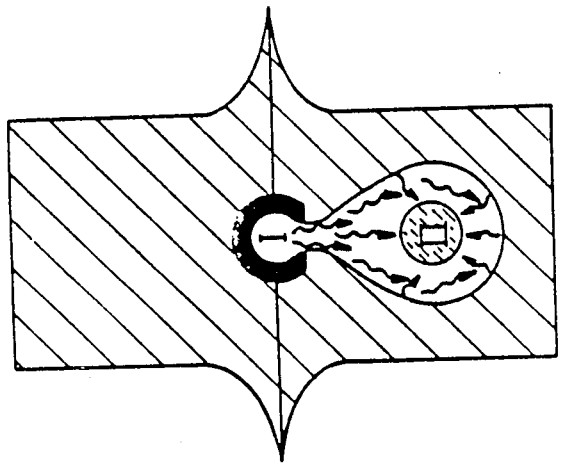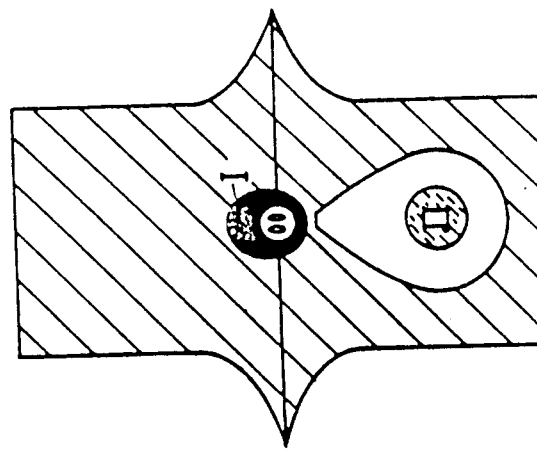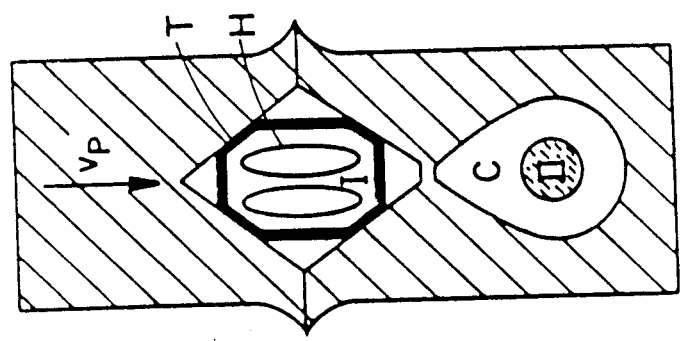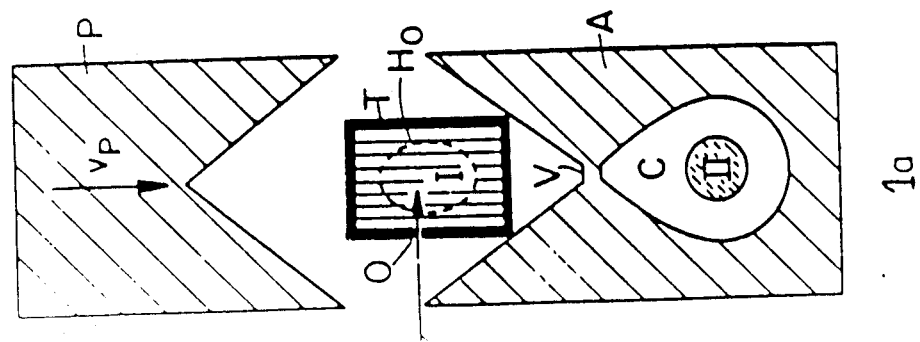

METHOD FOR THE RELEASE OF THERMONUCLEAR ENERGY COMBINING IMPACT, MAGNETIC AND INERTIAL CONFINEMENT FUSION

BACKGROUND OF THE INVENTION

Inertial confinement fusion requires driver energies of a few MJ with a power in excess of 100 TW and must be focusable onto an area less than $\sim 1$ cm$^2$. All driver concepts presently under study have in common that they deliver the energy in form of a beam. Five of these driver concepts are (1) laser beams, (2) relativistic electron beams, (3) light ion beams, (4) heavy ion beams and (5) macroscopic projectiles. Of these drivers only relativistic electron and light ion beams can be cheaply produced, but this advantage is offset by the difficulty to meet with them the stand-off requirements for the target from the walls inside a thermonuclear reactor. Heavy ion beams, but even more so laser beams, both of which easily meet this requirement, have the drawback to be very expensive. Macroscopic projectiles also easily meet this requirement but should be also rather expensive if the minimum needed velocity is about $\sim 200$ km/sec. Even though all previous studies on impact fusion[1] have suggested a minimum velocity of this magnitude, the fast liner approach to nuclear fusion[1,2,3,4,5] shows that substantially smaller velocities can be used for magnetized, less than solid density, targets and for which only $\sim 20$ km/sec may suffice. Rather than producing these velocities by liner implosion one may generate them separately from the plasma by a mass accelerator and to let a projectile make an impact upon a magnetized target. Studies on this concept were made by Ribe and Vlases[1] and also by Tidman and Goldstein[5]. In this concept however, the much lower target density results in a comparatively low thermonuclear gain. Therefore, unless the target is made rather large, no net energy gain can be obtained.

This drawback can be overcome in the novel approach suggested here. In this approach again a $\sim 20$ km/sec projectile also serves here to ignite a thermonuclear reaction in a magnetized, less than solid density, target, but the energy released in this low density low yield target is now used to ignite a second high density high yield target. This two stage target promises very large final thermonuclear yields even with a comparatively low initial impact velocity. Furthermore, the required impact velocities are here so small that they can be cheaply produced by magnetic acceleration or isentropic light gas guns[1].

BRIEF DESCRIPTION OF DRAWINGS

FIG. 1a shows a projectile and target structure prior to impact.

FIG. 1b shows a projectile and target structure at time of impact.

FIG. 1c shows the sealed target imploded and in a state of maximum compression.

FIG. 1d shows the imploded target initiating fusion events in the cavity of the target structure.

DETAILED DESCRIPTION OF THE INVENTION

The basic principle of our approach is explained in FIG. 1. In FIG. 1a and incoming projectile having a conical hole implodes a cylindrical target chamber, which is positioned in the conical hole of an anvil A. The space inside the target chamber is filled with DT gas of relatively low density and serves as the first stage target I. The DT gas is furthermore permeated by a magnetic field of $H_o \sim 10^5$ G, which can be set up if the target chamber consists of a one-turn pulsed solenoid. Alternatively it may be also produced by using for the target chamber a small hollow superconducting coil, or by strong ferromagnets like gadolinium with a saturation field strength of $\sim 60$ kG, if the upper and lower end of the target chamber consist of permanent magnets.

Just prior to the moment, shown in FIG. 1a, where the incoming projectile strikes the target chamber, a short pulse relatively low energy, beam passes through an opening O into the target chamber preheating the DT gas to about $T_o \sim 10^{6\circ}$ K. The resulting magnetized DT plasma confined in the target chamber is then highly compressed by the rapidly moving projectile making the cavity shrink in size. This leads to a rapid rise of the magnetic field trapped inside the target chamber, and, as shown in FIG. 1b, results in magnetic field reversal closing the field lines. This magnetic field reversal is caused by induced currents on the inner wall of the target chamber. After field reversal has taken place the heat conduction losses of the DT plasma to the walls of the target chamber are restricted to those perpendicular to the magnetic field, greatly increasing the energy confinement time.

If all energy losses are neglected the plasma temperature and magnetic field in the target chamber will rise as $$T/T_o = H/H_o = (l_o/l)^2, \tag{1}$$

where $l_o$ and $l$ are the linear dimension of the target chamber at the beginning of the implosion process and some time later. Field reversal occurs at $H \geq 2H_o$, that is for $1 \leq l_o/\sqrt{2}$. Since a temperature of $T_i \approx 10^{8\circ}$ K. is needed to reach thermonuclear ignition, the cavity has to be imploded to a minimum diameter $l_{min} \approx l_o/10$. Therefore, apart from the initial phase of the implosion process the magnetized plasma is most of the time in a state of complete field reversal. At the final minimum diameter of the target chamber the magnetic field has risen to its maximum value $H_{max} \approx 10^7$ G. This state of maximum compression is shown in FIG. 1c.

After reaching the ignition temperature $T_i$ the DT plasma confined inside the target chamber, makes a thermonuclear excursion greatly increasing its total internal energy. The rapid rise in the internal energy caused by the thermonuclear reactions leads to a rapid rise in the plasma pressure which eventually ruptures the confining cavity wall at its weakest point. If this weakest point is chosen to be at the vertex point of the conical part of the cavity formed by the anvil, a large amount of energy in form of radiation and hot plasma will be released into the adjacent chamber C inside the anvil and into which a second stage dense thermonuclear target II is placed. This event is shown in FIG. 1d. The energy flowing into the chamber C will then ablatively implode and ignite target II. It is this second stage target II which releases most of the energy. Only in this two stage target arrangements are substantially smaller impact velocities permitted without paying the price of a small gain.

The invention thus far outlined shall now be supported by some more quantitative estimates:

(1) Let us assume that the projectile has a density $\rho_p \simeq 10$ g/cm$^3$ and moves with $v_p = 2 \times 10^6$ cm/sec, leading upon impact to a stagnation pressure $p_s = (\frac{1}{2})\rho_p v_p^2 = 2 \times 10^{13}$ dyn/cm$^2$, and which must be equal to the final plasma pressure in the target chamber $p = 2nkT_i$ at $T_i \simeq 10^{8\circ}$ K. One thus finds that $n \simeq 10^{21}$ cm$^{-3}$. The initial density of the DT gas inside the target chamber is smaller by the factor $(l_{min}/l_o)^3 \simeq 10^{-3}$. Therefore, the initial density of the gaseous DT target is $n_o \simeq 10^{18}$ cm$^{-3}$.

(2) Let us assume that the initial and final diameter of the target chamber are $l_o \simeq 4$ cm and $l_{min} \simeq 0.4$ cm. The volume at maximum compression is thus $l_{min}^3 \simeq 6 \times 10^{-2}$ cm$^3$ and the total number of atoms in the chamber is $N \sim 6 \times 10^{19}$.

(3) Because the implosion of the chamber is three-dimensional, the time in which the DT gas is heated from $T_o \simeq 10^{6\circ}$ K. up to $T_i \simeq 10^{8\circ}$ K., under the assumption that the compression is completely isentropic, is given by $$\tau_A \simeq (l_o/2v_p). \tag{2}$$

In our example we find $\tau_A \simeq 10^{-6}$ sec. This time has to be smaller than the radiative loss time $\tau_R$ due to bremsstrahlung and the heat conduction loss time $\tau_c$ in the presence of a strong transverse magnetic field. Otherwise our assumption that the DT gas is isentropically compressed is invalid. The loss time for bremsstrahlungs is given by $$\tau_R \simeq 3 \times 10^{11} T^{\frac{1}{2}}/n, \tag{3}$$

and for heat conduction by $$\tau_c \simeq 2.5 \times 10^{-2}(l_{min}H)^2 T^{\frac{1}{2}}/n. \tag{4}$$

In our example with $n = 10^{21}$ cm$^{-3}$, $T = 10^{8\circ}$ K., $H = 10^7$ G and $l_{min} = 0.4$ cm we find $\tau_R \simeq 3 \times 10^{-6}$ sec and $\tau_c \simeq 4 \times 10^{-6}$ sec. The assumption of isentropic compression is therefore reasonably well satisfied.

(4) To heat a plasma composed of $N \simeq 6 \times 10^{19}$ ions to $T_o = 10^{6\circ}$ K. requires the energy $E_o = 3NkT \simeq 2.4 \times 10^{10}$ erg = 2.4 kJ. This relatively small energy required to preheat can be easily supplied by a short pulse laser or charged particle beam. Because the beam pulse has to enter the chamber through a small opening in the target chamber, a laser beam seems to be better suited for this purpose. Furthermore, since the initial density of the DT gas is rather low an infrared gas laser of high efficiency can be used.

(5) To heat the DT gas by isentropic compression to the ignition temperature of $T_i \simeq 10^{8\circ}$ K. requires that its inertial energy be raised to $E_i = 3NkT_i \simeq 2.4 \times 10^{12}$ erg. Assuming pessimistically that only about 1% of the kinetic projectile energy goes into this internal energy, its energy would therefore have to be $2.4 \times 10^{14}$ erg. With a projectile velocity of $2 \times 10^6$ cm/sec the projectile mass is then $m_p = 120$ g. The remaining 99% of the projectile energy would not be lost but would serve to inertially confine the target. Under this assumption most of the energy is used for inertial confinement and not for ignition, similar as in laser or charged particle beam fusion.

(6) After the DT plasma has reached the thermonuclear ignition temperature $T_i \simeq 10^{8\circ}$ K. the part of the thermonuclear energy set free in form of $\alpha$-particles is dissipated within the DT plasma because the Larmor radius of these $\alpha$-particles at $H = 10^7$ G is $r_L \simeq 0.03$ cm and thus more than 10 times smaller than the diameter of the imploded chamber which is $l_{min} \simeq 0.4$ cm. As a result the DT plasma undergoes a thermonuclear excursion rising its temperature to much higher values as long as the inertial confinement lasts. The inertial confinement time is of the order $$\tau_i \simeq h/v_p \tag{5}$$

where h is the thickness of the dense material of which both the projectile and the anvil tamping the chamber are composed. The value of h can be estimated putting $h^3 \tau_p = m_p$, which in our example with $\tau_p = 10$ g/cm$^3$ and $m_p = 120$ g gives $h = 2.3$ cm. It thus follows that $\tau_i \simeq 10^{-6}$ sec. The fuel burn-up time at the other hand is given by $$\tau_b \simeq (n \langle \sigma v \rangle)^{-1} \tag{6}$$

where $\langle \sigma v \rangle$ is the fusion cross section averaged over a Maxwellian velocity distribution. In a thermonuclear excursion the temperature rises until $\langle \sigma v \rangle$ has reached its maximum. For the DT reaction this maximum is $\langle \sigma v \rangle_{max} \simeq 10^{-15}$ cm$^3$/sec and is reached at a temperature of $\sim 8 \times 10^{8\circ}$ K. Using our value of $n = 10^{21}$ cm$^{-3}$ we thus find that $\tau_b \simeq 10^{-6}$ sec.

(7) Since $\tau_i \simeq \tau_b$ we may assume a large fuel burn-up, for example 50%. The total energy released into $\alpha$-particles, each having a kinetic energy of 2.8 MeV, for a DT plasma of $6 \times 10^{19}$ ions, is given by $$E = \frac{1}{2}\{6 \times 10^{19}\}(4.5 \times 10^{-6}) = 3.4 \times 10^{14} \text{ erg} = 34 \text{ MJ}. \tag{7}$$

This energy suddenly released inside the target chamber will raise the plasma pressure to the order $p \sim E_\alpha/l_{min}^3 \simeq 5 \times 10^{15}$ dyn/cm$^2$ and which is about 100 times larger than the magnetic pressure at $10^7$ G. As a result the hot plasma will convectively mix with the wall material. Because of this mixing effect most of the energy will go into black body radiation. The temperature $T_b$ of this black body radiation is determined by $$aT_b^4 = E_\alpha/l_{min}^3 \tag{8}$$

where $a = 7.67 \times 10^{-15}$ erg/cm$^{3\circ}$ K.$^4$, and one finds that $T_b \simeq 3 \times 10^{7\circ}$ K. If we assume that by the high pressure the chamber is permitted to expand $\sim 3$-fold before the weak point at the vertex position breaks, the temperature would go down to $T_b' = T_b/3 \simeq 10^{7\circ}$ K.

(8) After rupture of the weak point at the vertex the photon energy flux into the cavity C, and inside which the high yield thermonuclear target is placed, is then given by $$P = \sigma T_b'^4 \tag{9}$$

where $\sigma = ac/4 = 5.75 \times 10^{-5}$ erg/cm$^2$sec $^\circ$ K.$^4$. With $T_b' = 10^{7\circ}$ K. one finds that $P = 5.75 \times 10^{23}$ erg/cm$^2$sec = $5.75 \times 10^{16}$ W/cm$^2$. If the cross section of the opening formed at the breaking point and through which the energy can flow is of the color $l_{min}^2 \sim 10^{-1}$ cm$^2$, the power flux through this opening is $\sim 5 \times 10^3$ TW. Of the total initially available energy equal to about 30 MJ only one third, that is $\sim 10$ MJ, is available as black body radiation. The remaining ~20 MJ go into work expanding the target chamber ~3-fold in its diameter, but the available ~10 MJ are more than enough to implode a high density, high yield thermonuclear target. The wave length of black body radiation at $T_b' \simeq 10^{7\circ}$ K. is sufficiently short to assure good coupling to the target for densities up to ~$10^4$ times solid densities.

REFERENCES (1) Proceedings of the Los Alamos Impact Fusion Workshop, July 10–13, 1979, Los Alamos Scientific Laboratory Report LA—8000 C.
(2) J. G. Linhart, H. Knoepfel and C. Gourlan, Nucl. Fusion Supplement Pt 2, 733 (1962).
(3) S. G. Alikhanov and I. S. Glushkov, Soviet Phys. Dokl. 21 37 (1976).
(4) C. Rioux, C. Jablon, Nucl. Fusion 15 425 (1975).
(5) R. A. Gerwin and R. C. Malone, Nucl. Fusion 19 155 (1979).
(6) D. A. Tidman and S. A. Goldstein, Jaycor Technical Report 350-80-002 and Bull. of the American Physical Society 25 589 (1980).
(7) F. Winterberg, Atomkernenergie 35 223 (1980) and Z.f. Physik, A 296 3 (1980).

I claim:
1. A method for the release of nuclear energy comprising:
   (a) at least one means accelerating a mass weighing at least one hectogram to at least 10 km/sec,
   (b) directing the mass to impact a target structure comprising a body having a cavity therein, an indentation adjacent the cavity, a sealed target chamber containing a first amount of fusion fuel therein positioned in the indentation and the cavity containing a second amount of fusion fuel,
   (c) creating a multi-kilogauss field about said target chamber whereby upon impact of the mass upon the target chamber a magnetized plasma is created which in turn creates a plasma in the cavity by ablatively driven implosion from either black body radiation or shock waves from the magnetized plasma.

2. The application of the method according to claim 1 for the generation of useful power by letting a sequence of nuclear microexplosions take place inside a reactor chamber.

3. The application of the method according to claim 1 for the propulsion of spacecraft by letting a sequence of nuclear microexplosions take place behind a pusher plate or concave reflector.

4. The application of the method according to claim 1 where the target structure includes a small amount of fissile material is compressed with the goal of controlled release of fission energy in small bursts for stationary power plants or spacecraft propulsion.

5. The application of the method according claim 1 where the the sealed target chamber is composed of both fissile and fusionable material and together being ablatively compressed by the black body radiation for enhanced fission and fusion yield of the ensuing microexplosions.

* * * * *